(12) United States Patent
Tsuruta et al.

(10) Patent No.: US 8,391,205 B2
(45) Date of Patent: Mar. 5, 2013

(54) MOBILE COMMUNICATION APPARATUS THAT STORES PACKET DATA IN A PACKET CALL ESTABLISHMENT PROCESS

(75) Inventors: Kenji Tsuruta, Yokosuka (JP); Aki Ohashi, Yokohama (JP); Hiromi Himeno, Yokohama (JP); Masashi Kanauchi, Yokosuka (JP); Kei Akiyama, Suita (JP)

(73) Assignee: NTT DoCoMo, Inc., Tokyo (JP)

( * ) Notice: Subject to any disclaimer, the term of this patent is extended or adjusted under 35 U.S.C. 154(b) by 758 days.

(21) Appl. No.: 12/161,857

(22) PCT Filed: Nov. 27, 2006

(86) PCT No.: PCT/JP2006/323575
§ 371 (c)(1),
(2), (4) Date: Sep. 26, 2008

(87) PCT Pub. No.: WO2007/083446
PCT Pub. Date: Jul. 26, 2007

(65) Prior Publication Data
US 2009/0196220 A1 Aug. 6, 2009

(30) Foreign Application Priority Data
Jan. 23, 2006 (JP) .................................. 2006-014147

(51) Int. Cl.
*H04W 4/00* (2009.01)
*H04L 12/40* (2006.01)
*H04L 1/00* (2006.01)
*H04L 12/26* (2006.01)
*G01R 31/08* (2006.01)
*G06F 11/00* (2006.01)
*G08C 15/00* (2006.01)
*H04J 1/16* (2006.01)
*H04J 3/14* (2006.01)

(52) U.S. Cl. ........ 370/328; 370/230; 370/231; 370/235; 370/236; 370/439

(58) Field of Classification Search ........................ None
See application file for complete search history.

(56) References Cited

U.S. PATENT DOCUMENTS
7,209,464 B2 * 4/2007 Park et al. ..................... 370/338
(Continued)

FOREIGN PATENT DOCUMENTS
JP 5 30150 2/1993
JP 2001 298486 10/2001
(Continued)

*Primary Examiner* — Faruk Hamza
*Assistant Examiner* — Diane Lo
(74) *Attorney, Agent, or Firm* — Oblon, Spivak, McClelland, Maier & Neustadt, L.L.P.

(57) ABSTRACT

When a browser is started up by a user, a packet call establishment request unit of a cellular phone requests the start of processing for establishing a packet call, and a communication control unit executes a packet all establishment processing. A mobile communication network sends a packet call establishment response message to the cellular phone, then sends packet data. A packet date storage unit of the cellular phone stores the packet data in a memory when packet data is received before the packet call establishment response message. If the packet call establishment response message is received thereafter, the packet data storage unit reads the packet data from the memory, and deletes the packet data from the memory. The packet processing execution unit displays a screen corresponding to the packet data on the display. Thereby, instances when packet data is discarded is decreased.

4 Claims, 4 Drawing Sheets

U.S. PATENT DOCUMENTS

| | | | | |
|---|---|---|---|---|
| 7,349,400 B2 * | 3/2008 | Khirman | | 370/394 |
| 2003/0208628 A1 * | 11/2003 | Karjanlahti | | 709/249 |
| 2003/0214949 A1 * | 11/2003 | Shaikli | | 370/394 |
| 2005/0172012 A1 * | 8/2005 | Casati | | 709/220 |
| 2006/0023663 A1 * | 2/2006 | Kim et al. | | 370/329 |
| 2006/0198347 A1 * | 9/2006 | Hurtta et al. | | 370/338 |

FOREIGN PATENT DOCUMENTS

| | | |
|---|---|---|
| JP | 2002 319951 | 10/2002 |
| JP | 2003 92781 | 3/2003 |
| JP | 2003 174671 | 6/2003 |
| JP | 2005 311871 | 11/2005 |

* cited by examiner

MOBILE COMMUNICATION APPARATUS THAT STORES PACKET DATA IN A PACKET CALL ESTABLISHMENT PROCESS

TECHNICAL FIELD

The present invention relates to a mobile communication apparatus which performs packet communication.

BACKGROUND ART

To start communication of packet data by using a mobile communication apparatus, represented by a cellular phone, a packet call, which is a call for packet communication, is established first, then transmission/reception of packet data is started. Specifically, the mobile communication apparatus transmits a PDP (Packet Data Protocol) establishment request message to a mobile communication network, for example, and receives a PDP establishment response message from the mobile communication network in response to this message. By this, the packet call is established. Then the mobile communication apparatus receives the packet data from the mobile communication network. This technology, related to PDP establishment messages, is disclosed in Patent Document 1, for example.

Patent Document 1: Japanese Patent Application Laid-Open No. 2003-174671

DISCLOSURE OF THE INVENTION

Problem to be Solved by the Invention

With the above mentioned technology, however, for example, when a transmission delay is generated in the mobile communication network, packet data may be received before receiving the PDP establishment response message. If such a case occurs, the packet data received before the PDP establishment response message is discarded.

With the foregoing in view, it is an object of the present invention to provide a mobile communication apparatus which can decrease the instances when packet data is discarded.

Means for Solving the Problem

A mobile communication apparatus of the present invention includes: packet call establishment request means for requesting to establish a packet call, which is a call for packet communication; reception means for receiving a packet call establishment response message corresponding to the request, and packet data; storage means for storing a received packet data when the packet data is received by the reception means before the packet call establishment response message is received by the reception means; and execution means for reading the packet data stored by the storage means and executing processing according to the packet data when the packet call establishment response message is received by the reception means after the received packet data is stored by the storage means.

According to this invention, when a packet data is received before receiving a packet call establishment response message, the received packet data can be stored in the memory, and when a packet call establishment response message is received after a packet data is stored in the memory, the packet data stored in the memory can be read, and processing according to the read packet data can be executed. By this, even when a packet data is received before receiving a packet call establishment response message, processing according to this packet data can be executed, so the packet data can be displayed on the display without loss, for example.

It is preferable that the mobile communication apparatus of the present invention further includes delete means for deleting the packet data stored by the storage means after a predetermined time has elapsed, since the received packet data is stored by the storage means. By this, unnecessary packet data can be deleted, and memory efficiency can be improved.

Effects of the Invention

According to the mobile communication apparatus of the present invention, instances when packet data is discarded can be decreased.

Figure 1:
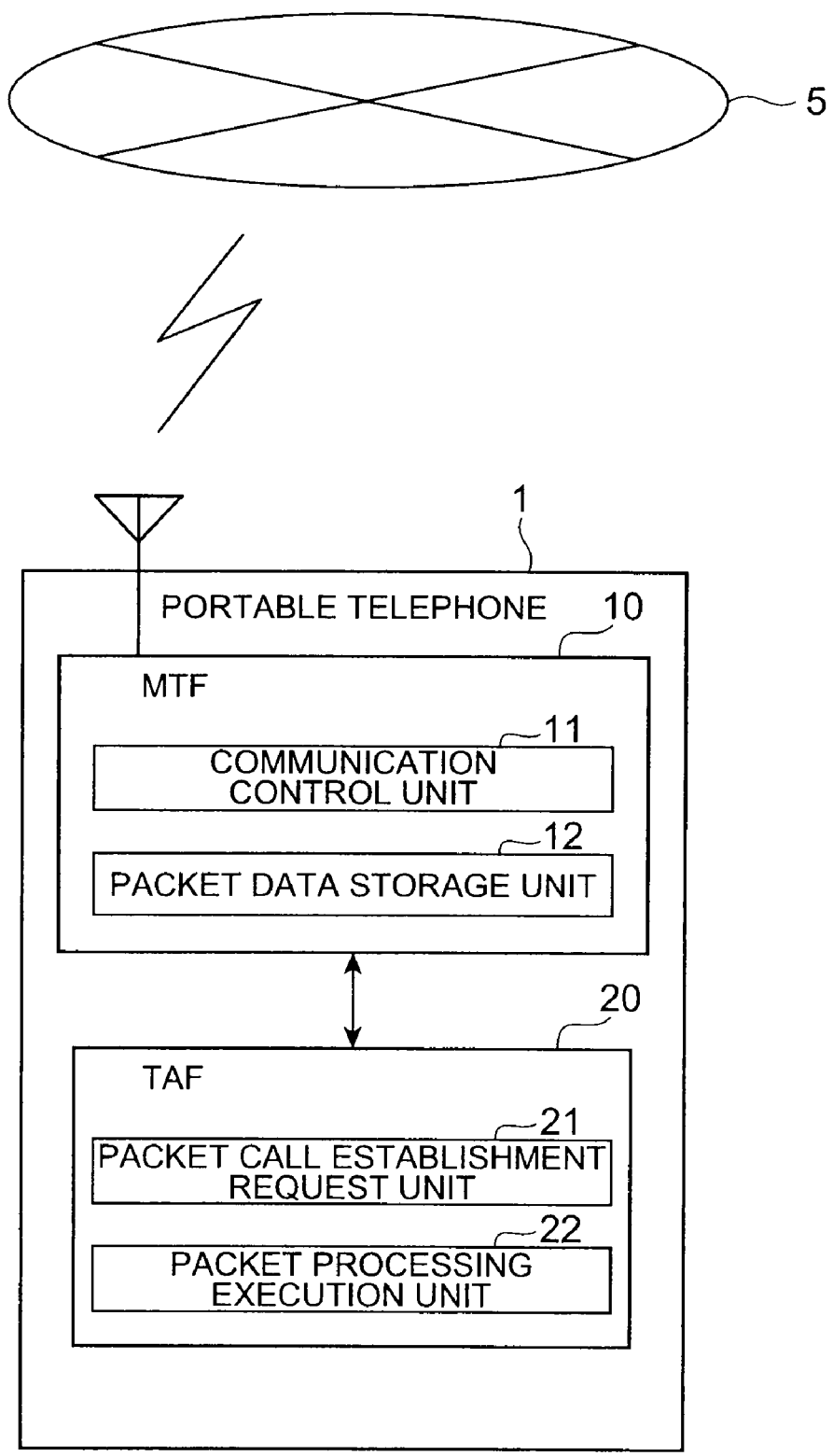
FIG. 1 is a diagram depicting an example of a function configuration of a cellular phone according to an embodiment of the present invention.

EXPLANATION OF REFERENCE NUMERALS 1 cellular phone
5 mobile communication network
10 MTF
11 communication control unit
12 packet data storage unit
20 TAF
21 packet call establishment request unit
22 packet processing execution unit

BEST MODE FOR CARRYING OUT THE INVENTION

Embodiments of the mobile communication apparatus according to the present invention will now be described with reference to the drawings. In each drawing, the same composing elements are denoted with a same reference symbol, where redundant description is omitted.

FIG. 1 is a diagram depicting a function configuration example of a cellular phone 1 according to an embodiment. The cellular phone 1 is a mobile communication apparatus which performs radio communication with a base station included in a mobile communication network 5. Specifically, the cellular phone 1 performs radio communication with a base station which covers a radio area where this cellular phone 1 is located, and receives a call service or packet communication service. Physically the cellular phone 1 comprises a CPU, communication device, memory, input key, display, or the like.

In the present embodiment, a cellular phone is described as an example of the mobile communication apparatus, but an example of the mobile communication apparatus is not limited to this, but may also be such a mobile communication apparatus as a simplified cellular phone (PHS) or a portable information terminal (PDA) having a communication function.

Now a function configuration of the cellular phone 1 will be described with reference to FIG. 1. As FIG. 1 shows, the cellular phone 1 comprises an MTF (Mobile Termination Function) 10 and a TAF (Terminal Adaptation Function) 20. Each function of the MTF 10 and TAF 20 is implemented by the CPU, reading and executing various programs which are stored in a memory in advance.

The MTF 10 controls the transmission/reception of control data which is exchanged with the mobile communication network 5 when a packet communication or circuit switching communication is started, and performs processing to establish a call for each communication with the mobile communication network 5. The MTF 10 also controls the transmission/reception of communication data including packet data and voice data. The packet data refers to, for example, display data of the screen to be displayed on a display and mail data of electronic mail.

If the start of packet communication or circuit switching communication is instructed, the TAF 20 requests the MTF 10 to start processing to establish a call for each communication with the mobile communication network 5. The instruction to start the packet communication is sent, for example, when the user starts up a browser, when the user sends an e-mail, or when mail is received from a mobile communication network. The instruction to start circuit switching communication is sent, for example, when the user inputs a telephone number and presses a call key.

The TAF 20 also executes various processings, including packet processing, required for packet communication and voice processing required for circuit switching communication. The packet processing refers, for example, to the processing for converting packet data, which is received from the mobile communication network, into text data, and displaying the text data on a display, or processing for converting text data, which is received via input keys or a PC terminal, into packet data and sending the packet data to the mobile communication network. The voice processing refers, for example, to the processing for converting voice data, which is received from the mobile communication network, into voice and outputting the voice via a speaker, or processing for converting voice, which is input via a microphone, into voice data, and sending the voice data to the mobile communication network.

The present invention is characterized in that packet data can be effectively processed even when the packet data is received before receiving the packet call establishment response message. Therefore in the following description, a function to implement a characteristic function unique to the present invention will be described, out of the functions of the MFT 10 and the TAF 20. The packet call establishment response message is a response message which is sent from the mobile communication network 5 to the cellular phone 1 when a packet call is established between the cellular phone 1 and the mobile communication network 5.

The MTF 10 comprises a communication control unit 11 (reception means), and a packet data storage unit 12 (storage means, delete means).

The communication control unit 11 functions as an interface between the TAF 20 and the mobile communication network 5 when the cellular phone 1 performs packet communication.

Specifically, the communication control unit 11 executes packet call establishment processing for establishing a packet call, which is a call for packet communication, with the mobile communication network 5, for example. The packet call establishment processing refers, for example, to a processing for exchanging control data related to security, such as user authentication, with the mobile communication network 5, to establish a GMM (GPRS Mobility Management) connection, or processing for exchanging control data related to the setting of a radio resource, such as setting an individual channel, with the mobile communication network 5, to establish an SM (Session Management) connection. A processing for sending a PDP establishment request message to the mobile communication network 5 and receiving a PDP establishment response message from the mobile communication network 5 is also included in the packet call establishment processing. In the present embodiment, the PDP establishment response message is used as the packet call establishment response message which is sent from the mobile communication network 5 when a packet call is established.

If a predetermined condition is satisfied, the packet data storage unit 12 stores packet data, which is received by the communication control unit 11, in a memory. The predetermined condition in this case refers to when the communication control unit 11 receiving a packet data before receiving the packet call establishment response message. This status could occur when a transmission delay is generated in the mobile communication network. In other words, a packet data may be received before receiving the packet call establishment response message due to the transmission delay generated in the mobile communication network, although the packet data was sent after the packet call establishment response message was sent from the mobile communication network 5. In this case, the packet data storage unit 12 stores the packet data in the memory. This means that when the packet data is received after receiving the packet call establishment response message, the packet data storage unit 12 does not store the packet data in the memory. In this case, the received packet data is sent to the TAF 20, and packet processing is executed.

If a predetermined condition is satisfied, the packet data storage unit 12 also reads packet data from the memory, and sends the read packet data to the TAF 20, and deletes this packet data from the memory. The predetermined condition in this case refers to the communication control unit 11 receiving the packet call establishment response message after the packet data is stored in the memory.

The packet storage unit 12 also deletes a packet data, stored in the memory, from the memory after a predetermined time has elapsed since the time when the packet data received by the communication control unit 11 is stored in the memory. By this, unnecessary packet data can be deleted, and memory efficiency can be improved.

The TAF 20 comprises a packet call establishment request unit 21 (packet call establishment request means) and a packet processing execution unit 22 (execution means).

If the start of packet communication is instructed by a user starting up a browser, for example, the packet call establishment request unit 21 sends a packet call establishment request message, for requesting the start of processing for establishing a call for packet communication with the mobile communication network 5, to the MTF 10.

The packet processing execution unit 22 executes processing according to a packet data received from the mobile communication network 5. Processing according to the packet data refers to a processing for displaying display data on a display if the packet data is display data of the screen to be displayed on a display, or a processing for storing a received mail in a receive tray if the packet data is a mail data of an electronic mail.

Figure 2:
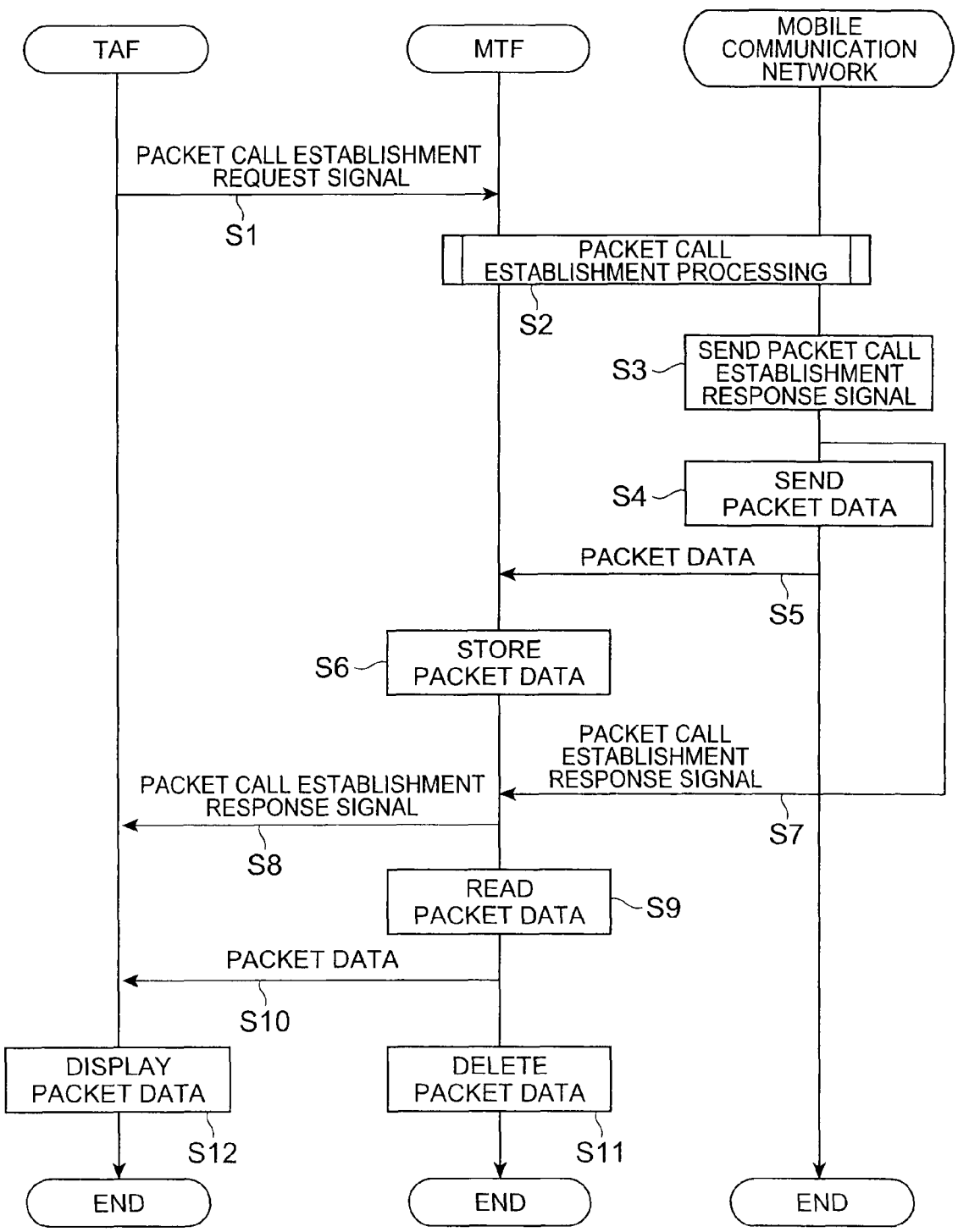
FIG. 2 is a sequence diagram depicting an operation example of the cellular phone of the present embodiment.
Figure 3:
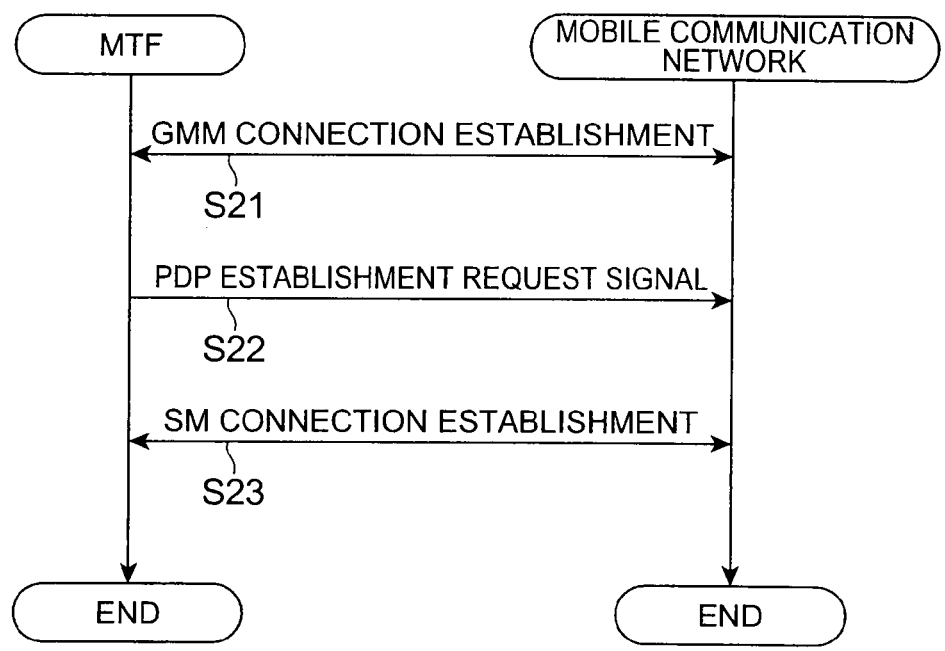
FIG. 3 is a sequence diagram depicting an example of the content of the packet call establishment processing shown in FIG. 2.
Figure 4:
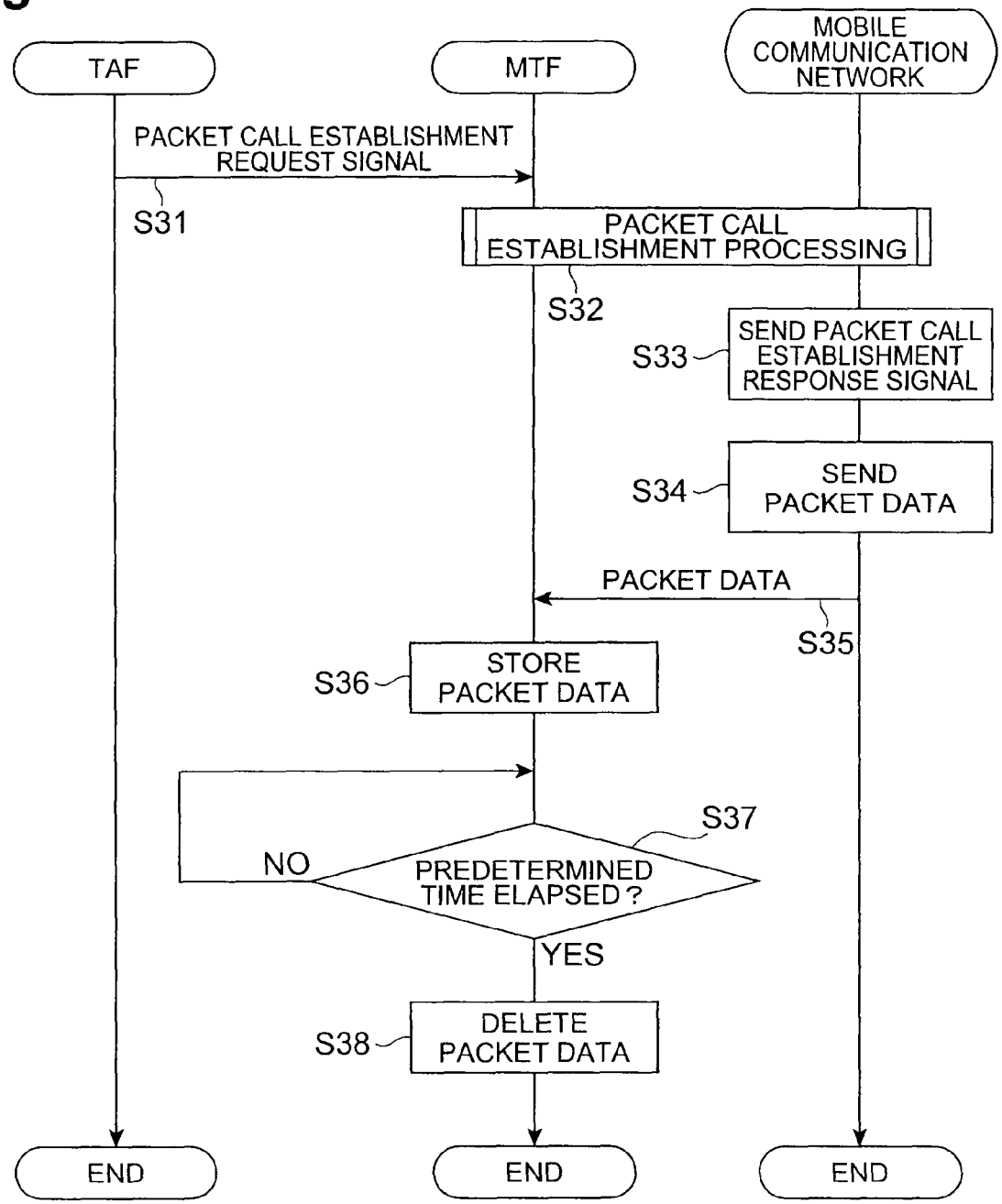
FIG. 4 is a sequence diagram depicting an operation example of the cellular phone of the present embodiment.

Now an operation of the cellular phone 1 of the present embodiment will be described with reference to FIG. 2 to FIG. 4. FIG. 2 is a sequence diagram depicting an example of an operation when the packet call establishment response message is received within a predetermined time since a packet data is received. FIG. 4 is a sequence diagram depicting an example of an operation when the packet call establishment response message is not received within a predetermined time since the packet data is received.

Now the operation when the packet call establishment response message is received within a predetermined time since the packet data is received will be described with reference to FIG. 2.

If the user starts up a browser, for example, the TAF 20 (packet call establishment request unit 21) of the cellular phone 1 sends a packet call establishment request message for requesting the start of processing for establishing a call for packet communication with the mobile communication network (step S1).

Then the MTF 10 (communication control unit 11) of the cellular phone 1 executes a packet call establishment processing for establishing the packet call with the mobile communication network 5 (step S2). Details on this packet call establishment processing will be described later.

Then the mobile communication network 5 sends a packet call establishment response message, for indicating that the packet call establishment processing ended, to the cellular phone 1 (step S3). Then the mobile communication network 5 sends the packet data to be displayed on the display of the cellular phone 1 (step S4).

Then the MTF 10 (communication control unit 11) of the cellular phone 1 receives the packet data sent by the mobile communication network 5 (step S5). In this case, the packet call establishment response message corresponding to the packet call establishment request message has not yet been received. Therefore the MTF 10 (packet data storage unit 12) of the cellular phone 1 stores the packet data received in step S5 in the memory (step S6).

Then the MTF 10 (communication control unit 11) of the cellular phone 1 receives the packet call establishment response message sent from the mobile communication network 5 (step S7). And the MTF 10 sends this packet call establishment response message to the TAF 20 (step S8).

Then the MTF 10 (packet data storage unit 12) of the cellular phone 1 reads the packet data, stored in the memory, from the memory (step S9).

Then the MTF 10 (packet data storage unit 12) of the cellular phone 1 sends the packet data read from the memory to the TAF 20 (step S10), and deletes this packet data from the memory (step S11).

Then the TAF 20 (packet processing execution unit 22) of the cellular phone 1 displays the screen corresponding to the received packet data on the display (step S12).

Now the above mentioned packet call establishment processing (step S2 in FIG. 2) will be described in detail, with reference to FIG. 3.

First the MTF 10 (communication control unit 11) of the cellular phone 1 performs transmission/reception of the control data related to security, such as user authentication, with the mobile communication network 5 (step S21). By this, a GMM connection is established between the cellular phone 1 and the mobile communication network 5.

Then the MTF 10 (communication control unit 11) of the cellular phone 1 sends a PDP establishment request message to the mobile communication network 5 (step S22).

Then the MTF 10 (communication control unit 11) of the cellular phone 1 performs transmission/reception of the control data related to the setting of a radio resource with the mobile communication network 5 (step S23). By this, SM communication is established between the cellular phone 1 and the mobile communication network 5. When this SM connection is established, the mobile communication network 5 sends the PDP establishment response message as the packet call establishment response message to the cellular phone 1 (see step S3 in FIG. 2).

Now an operation in the case when the packet call establishment response message is not received within a predetermined time since reception of the packet data will be described, with reference to FIG. 4. Out of each processing step shown in FIG. 4, the processings of step S31 to step S36 are the same as each processing of the above mentioned step S1 to step S6 shown in FIG. 2, so description on these processings is omitted.

After storing the packet data received from the mobile communication network 5 to the memory (step S36), the MTF 10 (packet data storage unit 12) of the cellular phone 1 judges whether a predetermined time has elapsed or not (step S37).

If the result of the judgment is YES (step S37: YES), the MTF 10 (packet data storage unit 12) of the cellular phone 1 deletes the packet data, stored in the memory, from the memory (step S38). If the result of the judgment in step S37 is NO (step S37: NO), reception of the packet call establishment response message waits until the predetermined time is elapsed.

As described above, according to the cellular phone 1 of the present embodiment, when the packet data is received before receiving the packet call establishment response message, this received packet data can be stored in the memory, and when the packet call establishment response message is received after the packet data is stored in the memory, the packet data stored in the memory can be read, and processing according to the read packet data can be executed.

By this, even when packet data is received before receiving the packet call establishment response message, processing according to this packet data can be executed. Therefore if the packet data is data to be displayed on the screen, for example, the screen can be displayed on the display without loss.

In the above mentioned embodiment, functions of the cellular phone 1 are described separately for the functions of the TAF 10 and the functions of the MTF 20, but each function need not always be assigned to the TAF and MTF. Therefore each function may be provided as one group, or each function may be provided individually.

The invention claimed is:

1. A mobile station, comprising:
   a packet call establishment request unit that requests to establish a packet call, which is a call for packet communication;
   a reception unit that receives a PDP (packet data protocol) packet call establishment response message corresponding to the request, and packet data, wherein the PDP packet call establishment response message is sent from a mobile communication network for establishing a packet call for packet communication with the mobile communication network;
   a storage unit that stores a received packet data when the packet data is received by the reception unit before the PDP packet call establishment response message that corresponds to the received packet data is received by the reception unit;
   an execution unit that reads the packet data stored by the storage unit, and executes processing according to the packet data when the PDP packet call establishment response message that corresponds to the received packet data is received by the reception unit after the received packet data is stored by the storage unit; and
   a display unit of the mobile station that displays visual data included in the packet data after the PDP packet call establishment response message is received.

2. The mobile station according to claim 1, further comprising a delete unit that deletes the packet data stored by the storage unit after a predetermined time has elapsed since the received packet data is stored by the storage unit.

3. The mobile station according to claim 1, wherein when the reception unit receives the packet data after receiving the PDP packet call establishment response message that corresponds to the received packet data, the reception unit forwards the received packet data to the execution unit without storing the received packet data in the storage unit.

4. A communication method, implemented by a mobile station, comprising:
   requesting, from the mobile station, to establish a packet call, which is a call for packet communication;
   receiving, at a reception unit of the mobile station, a PDP (packet data protocol) packet call establishment response message corresponding to the request, and packet data, wherein the PDP packet call establishment response message is sent from a mobile communication network for establishing a packet call for packet communication with the mobile communication network;
   storing, at a storage unit of the mobile station, a received packet data when the packet data is received by the reception unit before the PDP packet call establishment response message that corresponds to the received packet data is received by the reception unit;
   reading, at an execution unit of the mobile station, the packet data stored by the storage unit, and executing processing according to the packet data when the PDP packet call establishment response message that corresponds to the received packet data is received by the reception unit after the received packet data is stored by the storage unit; and
   displaying, at a display unit of the mobile station, visual data included in the packet data after the PDP packet call establishment response message is received.

* * * * *